(12) United States Patent
Tuttle et al.

(10) Patent No.: US 7,264,768 B2
(45) Date of Patent: Sep. 4, 2007

(54) SINGLE SUBSTRATE ANNEALING OF MAGNETORESISTIVE STRUCTURE

(75) Inventors: Mark E. Tuttle, Boise, ID (US); Ronald A. Weimer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 190 days.

(21) Appl. No.: 11/060,794

(22) Filed: Feb. 18, 2005

(65) Prior Publication Data

US 2005/0133118 A1 Jun. 23, 2005

Related U.S. Application Data

(62) Division of application No. 10/229,136, filed on Aug. 28, 2002, now Pat. No. 6,918,965.

(51) Int. Cl.
*F24J 3/00* (2006.01)

(52) U.S. Cl. ............... 266/249; 266/252; 432/227; 432/231

(58) Field of Classification Search .............. None
See application file for complete search history.

(56) References Cited

U.S. PATENT DOCUMENTS

| | | | |
|---|---|---|---|
| 5,496,759 A | | 3/1996 | Yue et al. |
| 5,595,241 A | * | 1/1997 | Jelinek .................. 165/80.1 |
| 5,840,125 A | * | 11/1998 | Gronet et al. .............. 118/730 |
| 5,871,588 A | * | 2/1999 | Moslehi et al. ............ 118/730 |
| 5,879,128 A | * | 3/1999 | Tietz et al. .................. 414/757 |
| 5,881,208 A | * | 3/1999 | Geyling et al. ............ 392/418 |
| 6,027,948 A | | 2/2000 | Jensen et al. |
| 6,048,739 A | | 4/2000 | Hurst et al. |
| 6,235,655 B1 | * | 5/2001 | Jozaki ........................ 438/795 |
| 6,455,815 B1 | * | 9/2002 | Melgaard et al. ........... 219/390 |
| 6,460,369 B2 | * | 10/2002 | Hosokawa .................. 62/378 |
| 6,614,005 B1 | * | 9/2003 | Walk et al. ................. 219/390 |
| 6,833,107 B2 | * | 12/2004 | Kuriyama et al. .......... 266/249 |
| 2001/0027969 A1 | * | 10/2001 | Takahashi et al. .......... 219/390 |

* cited by examiner

*Primary Examiner*—John P. Sheehan
(74) *Attorney, Agent, or Firm*—Dickstein Shapiro LLP

(57) ABSTRACT

A device for magnetically annealing magnetoresistive elements formed on wafers includes a heated chuck and a delivery mechanism for individually placing the wafers individually on the chuck one at a time. A coil is adjacent to the chuck and generates a magnetic field after the wafer is heated to a Néel temperature of an anti-ferromagnetic layer. A control system regulates the temperature of the heated chuck, the strength of the magnetic field, and a time period during which each chuck is heated to control the annealing process. The annealed elements are incorporated in the fabrication of magnetic memory devices.

7 Claims, 3 Drawing Sheets

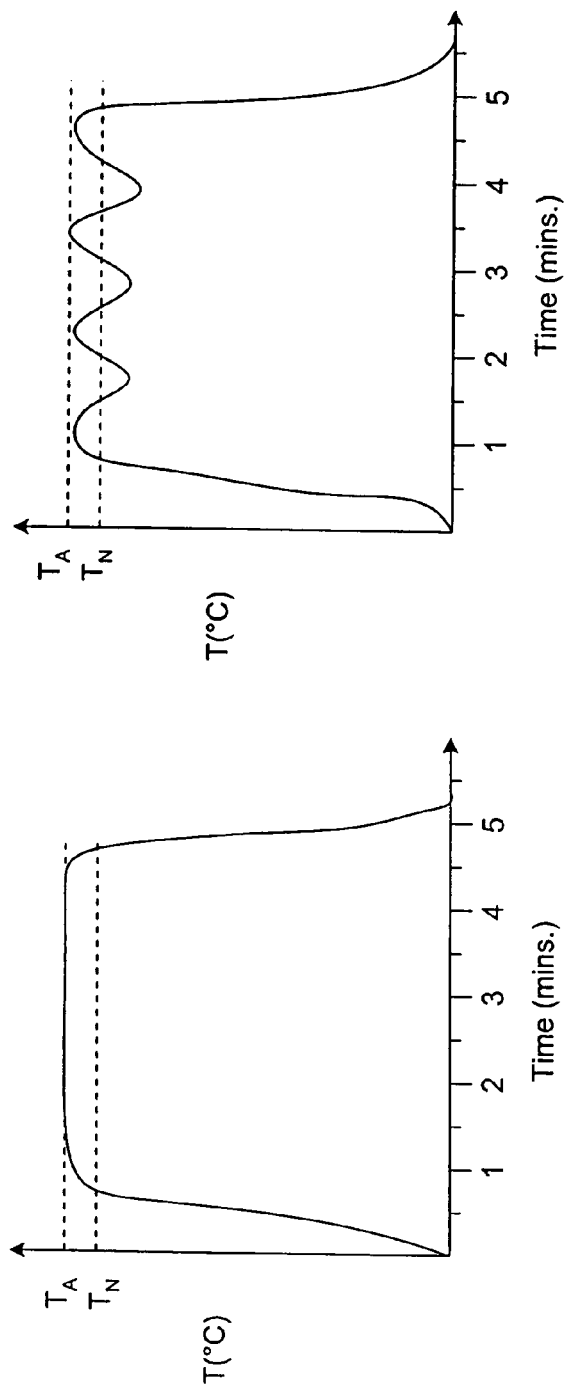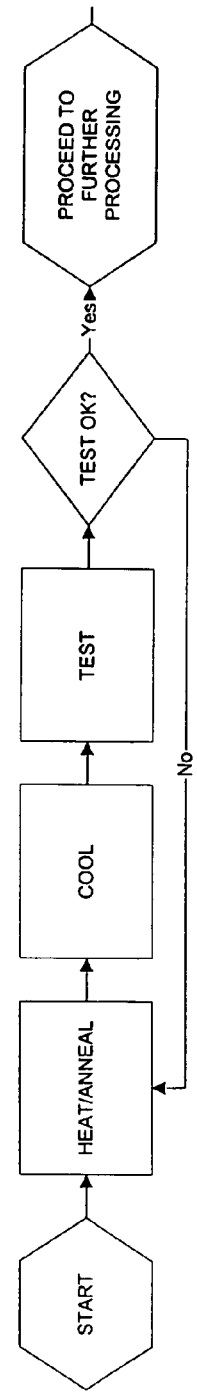

SINGLE SUBSTRATE ANNEALING OF MAGNETORESISTIVE STRUCTURE

CROSS REFERENCE TO RELATED APPLICATIONS

The present application is a divisional of U.S. patent application Ser. No. 10/229,136, filed on Aug. 28, 2002, now U.S. Pat. No. 6,918,965, the disclosure of which is incorporated in its entirety herein by reference.

BACKGROUND OF THE INVENTION

1. Field of the Invention

The invention relates to magnetic annealing of fabricated magnetic random access memory (MRAM) elements, and more specifically to single substrate magnetic annealing of magnetic random access memory elements.

2. Description of the Related Art

Various types of electronic devices utilize ferromagnetic materials with defined magnetic properties. Among these are magnetic random access memory (MRAM) devices which contain arrays of magnetic memory elements formed using magnetic tunnel junction (MTJ) or giant magnetoresistance (GMR) principals. Operation of the memory elements depends in part on a pinned magnetic layer having a specific orientation of the magnetic field. The pinned magnetic layer is typically pinned by an antiferromagnetic (AF) layer having a specific magnetic field orientation. In a typical application, the pinning is effected by a thin layer (~100 Å) of AF material, such as IrMn, adjacent a ferromagnetic (FM) material, such as NiFe.

An example of a layered structure 30 for a magnetic tunnel junction formed on a wafer is illustrated in FIG. 3. Structure 30 includes two outer lead layers 32, 44 made of tantalum (Ta). Sandwiched between the lead layers are a free ferromagnetic layer 34 and a pinned ferromagnetic layer 40 made of nickel-iron (NiFe). A tunneling barrier layer 36 of aluminum oxide ($Al_2O_3$) is provided between the two ferromagnetic layers, and a magnetic pinning (anti-ferromagnetic) layer 42 of iridium manganese fixes the orientation of the adjacent pinned ferromagnetic layer 40. The layers shown in FIG. 3 are representative: for example, the layers may be arranged differently, may use different materials, and are not necessarily equal in thickness.

Annealing is performed to fix the magnetic orientation of the pinned layer 40. By heating the material to its Néel temperature and applying a magnetic field until the material cools below the Néel temperature, the magnetic field of the iridium manganese is fixed in a particular orientation. The anti-ferromagnetic (AF) layer 42 adjacent the ferromagnetic layer 40 holds or "pins" the magnetic field of the ferromagnetic layer in a fixed orientation.

Known manufacturing processes for annealing the anti-ferromagnetic layer, for example, include a bulk process in which a batch of wafers is heated in a large oven to the Néel temperature and a strong magnetic field is applied while the wafers cool. As a result, anti-ferromagnetic layers formed on the wafers will have a fixed magnetic field orientation.

According to the known bulk processes, the applied magnetic field is generated either by a large electromagnet or a large permanent magnet. Either way, a powerful magnet is necessary to provide the required uniform magnetic field over the large volume of wafers. Consequently, the known bulk processes have several disadvantages, including the need for long heating cycles (greater than an hour, and up to five hours, for 25 wafers, for example) and large, bulky structures for magnetic field generation.

One difficulty of a prolonged annealing process, such as the bulk process described above, is interdiffusion of the ultra-thin layers of the layered structure 30. During heating, manganese ions, for example, tend to migrate through the layered structure from layer 42 through layer 40, and can build up against layer 36, forming a high-manganese concentration area as represented by the narrow layer 38. The build-up of manganese degrades the performance of the structure, for example, by disadvantageously diminishing the tunneling magnetoresistive (TMR) signal that otherwise would be generated by the device structure.

Referring to FIG. 4, a time vs. temperature plot 50 for one bulk anneal process is shown. A load of devices is heated in an oven which is held at an annealing temperature $T_A$. As can be seen from the graph, before and after reaching the Néel temperature $T_N$, the devices being annealed undergo heating for a significant period of time. During the extra heating time, unwanted changes can occur in the MRAM devices being annealed, such as manganese ion migration noted above.

In addition, when entire devices are being heated during the annealing process, high annealing temperatures may have adverse effects on other materials in the devices. Low temperature plasma enhanced chemical vapor deposition (PECVD) films may undergo densification or modification of stress levels, for example. Accordingly, prior art processing requirements can limit the types of materials to be used in fabrication of a magnetic memory element.

Further, in bulk processing, uniform magnetic field and heating parameters on individual wafers may be difficult to control. For example, the amount and duration of heating experienced by each device will vary with the device's position in the bulk processing chamber.

One attempt to avoid a bulk anneal process is disclosed in U.S. Pat. No. 6,027,948 to Jensen et al. In this patent, annealing is applied to a packaged die. The packaged die, containing magnetic memory elements, is placed in a fixture positioned between the poles of a magnet. The self-contained assembly of the combined die, fixture, and magnet is subjected to elevated temperatures. This process unnecessarily subjects the entire packaged device to heating, such that only limited, heat-resistant materials can be used in the package.

A method of annealing MRAM devices which does not damage the devices or any associated packaging would be desirable.

SUMMARY OF THE INVENTION

The present invention provides apparatus and processes for annealing individual wafers containing MRAM devices. A wafer is placed on a hot chuck and heated to the Néel temperature for the AF layer. A localized magnetic field generated by a permanent magnet or Helmholtz coil, for example, is applied to one wafer at a time as the wafer is cooled. The system allows for rapid heating and cooling of the wafer, and highly accurate and uniform temperature control. In addition, individual wafers can be cycled repeatedly to improve pinning uniformity and process control.

BRIEF DESCRIPTION OF THE DRAWINGS

These and other features and advantages of the invention will be more clearly understood from the following detailed description which is provided in conjunction with the accompanying drawings, as follows:

FIG. 5 is a graph illustrating a heating curve for an annealing process according to the present invention.

FIG. 6 is a graph illustrating a heating curve for an alternative annealing process according to the present invention.

FIG. 7 is a system flow diagram illustrating an apparatus and process for annealing for another alternative annealing process according to the present invention.

DETAILED DESCRIPTION OF THE INVENTION

Figure 1:
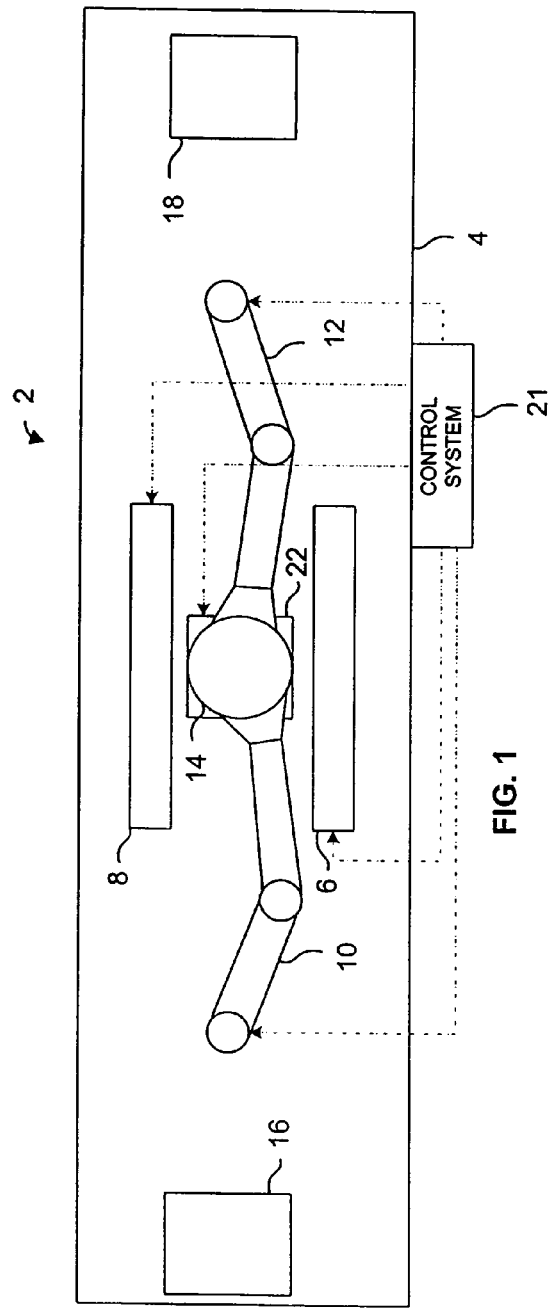
FIG. 1 is a plan view of an annealing apparatus according to the present invention.
Figure 2:
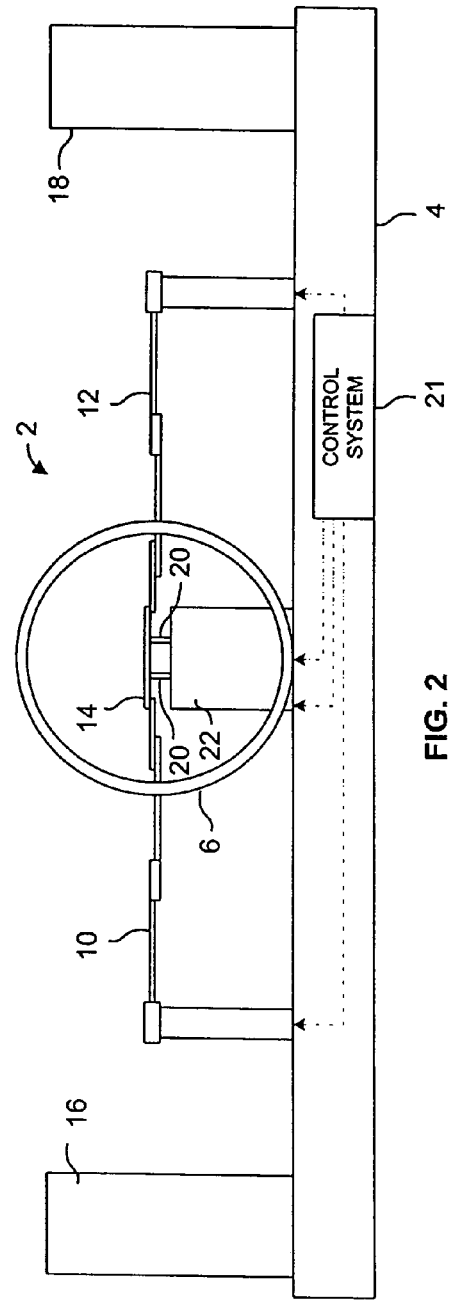
FIG. 2 is an elevational view of the annealing apparatus of FIG. 1.

Referring initially to FIGS. 1 and 2, an apparatus 2 is shown for annealing wafers in a magnetic memory device fabrication process according to the present invention. Annealing apparatus 2 includes a base 4 which supports a Helmholtz coil made up of current loops 6 and 8. The ideal Helmholtz coil includes two coaxial circular current loops with the same radius, separated from each other by one radius. Alternatively, a permanent magnet, such as an alnico or ferrite magnet, for example, could be used in place of the Helmholtz coil, the magnet being positioned as necessary to provide an effective magnetic field. A pair of robotic arms 10 and 12 transports a wafer 14 from an input cassette 16 through the annealing apparatus to an output cassette 18.

As shown in FIG. 2, wafer 14 is supported on retractable pins 20 above a heated chuck 22. The chuck and associated heater are made of non-magnetic materials. Alternatively, the wafer can be heated by other methods, including radiative lamps or lasers, for example. A computerized control system 21 regulates the temperature of the heated chuck, the robotic arms axis 10, 12 and the through-processing conditions experienced by the wafers. The strength of the magnetic field also can be regulated. Magnetic fields of about 2,000 Gauss are preferred, although fields of from about 100 Gauss to 3 Tesla can be utilized.

During operation, the wafer 14 is obtained from input cassette 16 and placed onto retractable pins 20 by robotic arm 10. The wafer is lowered onto the heated chuck 22 where the wafer quickly obtains the annealing temperature $T_A$ (above the Néel temperature $T_N$) by direct contact with the heated chuck, the heated chuck being maintained at a temperature above the Néel temperature. For example, if the Néel temperature is 200° C., the chuck is maintained at 225° C. or 250° C. Once the annealing temperature has been achieved by the wafer, a magnetic field is applied by coils 6, 8. Alternatively, the magnetic field can be applied while the wafer is being heated, the magnetic field being effective for pinning only once the wafer achieves the Néel temperature $T_N$.

After the required annealing time, the wafer is lifted from the heated chuck by retractable pins 20 for cooling. The wafer is lifted sufficiently away from the heated chuck to begin cooling, typically a quarter of an inch to a few inches, preferably about one inch. The wafers have a very low thermal mass, so heating and cooling take place in a matter of seconds. Additional cooling can be achieved by circulating air around the wafer. Alternatively, the wafer can be removed to a cooling area. As a further alternative, if radiative or laser heating is utilized, the source of heat is simply removed from the wafer. Cooling periods are typically on the order of about five to about twenty seconds.

According to a preferred embodiment, the wafer is maintained at an annealing temperature for approximately one to five minutes, as illustrated by the graph in FIG. 5. Cooling takes place rapidly, so cooling periods also are considerably shorter than the prior art methods. The wafer subsequently is moved from the pins by arm 12 and transported to the output cassette 18. Other, alternative methods of annealing according to the present invention are described below.

Figure 3:
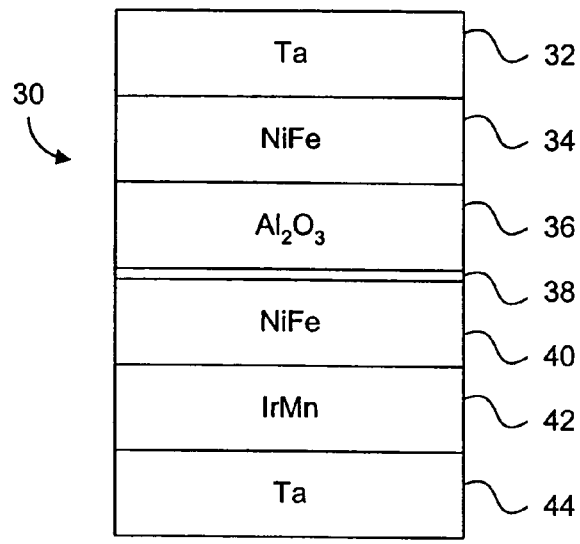
FIG. 3 shows layers of materials in a typical magnetic tunnel junction (MTJ) memory device.
Figure 4:
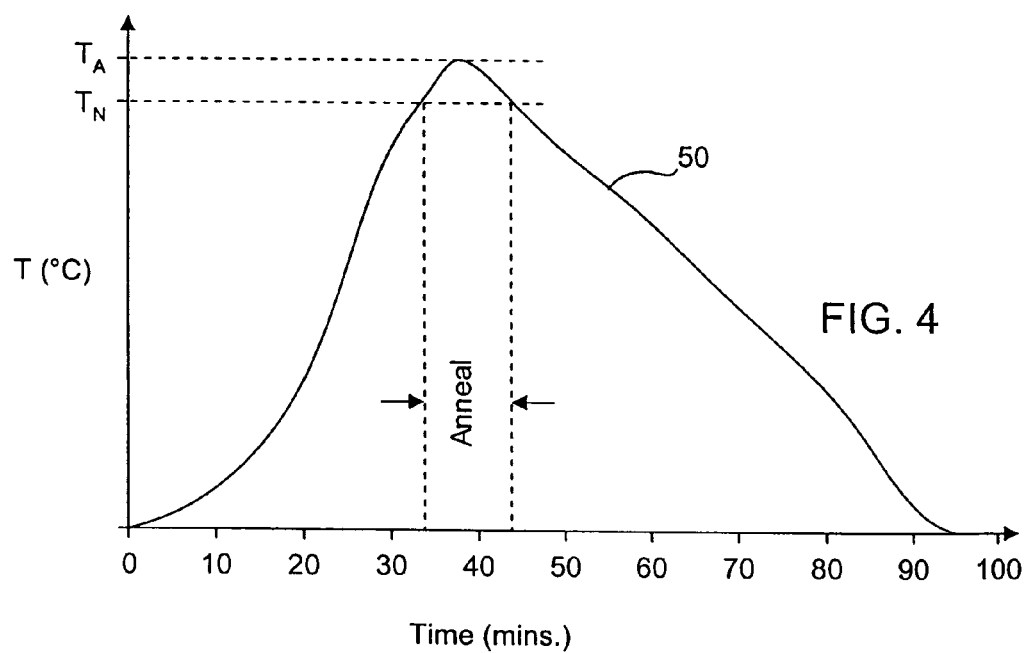
FIG. 4 is a graph illustrating a heating curve for a conventional bulk annealing process.

The reduced heating time obviates difficulties of a prolonged, bulk annealing process as noted above. For example, as shown in the layered structure 30 of FIG. 3, migration of manganese ions as tends to occur during heating is minimized. Therefore, a stronger signal generating capacity is retained in the finished device.

In addition, the faster heating and cooling periods allow for an alternative annealing process in which the temperature of an individual wafer is repeatedly cycled above and below the Néel temperature while a magnetic field is applied. Potential benefits of the alternative process include producing a more complete alignment, and providing improved pinning uniformity and control. As illustrated by the graph in FIG. 6, the wafer is first heated to a temperature at or approaching $T_A$, above $T_N$, then cooled to below $T_N$, then heated again above $T_N$. Further cycling can be carried out as desired. For a device having a $T_N$ of 200° C., for example, the heated chuck would be maintained at an annealing temperature $T_A$ of 225° C., and the wafer temperature cycled between about 225° C. and about 175° C. This type of cyclical processing can not practically be achieved using conventional batch systems which have extremely long cycle times.

Ambient control with inert gas such as argon can be utilized to avoid detrimental oxidation of materials on the wafer.

After annealing, the wafer undergoes quality control testing in which the magnetic properties of the wafer are tested, for example, as shown the by system flow diagram of FIG. 7. Various magnetic measuring systems are known for measuring magnetic properties of wafers, including what are commonly referred to as b-h loopers for measuring magnetic hysteresis loops. Magnetic measuring systems can be obtained from Shb Instruments, Inc, and other manufacturers. If the magnetic properties are found to be insufficient, it is possible to subject the wafer to further annealing by repeating the annealing process.

The present invention provides an apparatus and method for single substrate annealing of magnetoresistive structures. While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

The invention claimed is:

1. A device for annealing magnetoresistive device formed on wafers, the device comprising:
   a hot chuck;
   a delivery mechanism for placing wafers individually on the hot chuck and for removing the wafers from the hot chuck;
   a magnetic field generator for applying a magnetic field individually to the wafers; and
   a control system for controlling a temperature of the heated chuck and a magnitude of the magnetic field.

2. A device as in claim 1, wherein the control system further controls a time period during which said chuck is heated.

3. A device as in claim 1, wherein the control system further controls a time period during which the magnetic field is applied.

4. A device as in claim 1, further comprising an apparatus for testing magnetic properties of each wafer.

5. A device as in claim 4, further comprising an apparatus for returning each wafer to the delivery mechanism for replacing wafers individually on the hot chuck.

6. A device as in claim 1, wherein the magnetic field generator is one of an electromagnet and a permanent magnet.

7. A device as in claim 1, wherein the magnetic field generator is a Helmholtz coil.

* * * * *